United States Patent Office 2,952,683
Patented Sept. 13, 1960

2,952,683

REMOVAL OF ALKALI METAL IMPURITIES FROM LIQUID DIENE POLYMERS

Paul F. Warner, Phillips, Tex., assignor to Phillips Petroleum Company, a corporation of Delaware No Drawing. Filed Oct. 30, 1958, Ser. No. 770,600

6 Claims. (Cl. 260—290)

This invention relates to the removal of alkali metal impurities from liquid diene polymers.

Patent No. 2,631,175 discloses a polymerization process whereby liquid diene polymers are prepared using alkali metals as polymerization catalysts. The products produced by this process have considerable utility but further work has disclosed possibilities for improvements in the commercial operation of the process.

In the alkali metal polymerization of conjugated dienes and the like, it is necessary to treat the resulting reaction mixture in some manner to convert the alkali metal and reactive alkali metal organic compounds present to prevent further catalytic effect of the alkali metal on the product. Alkali metal catalysts are harmful if left in the product because they promote cross-linking of the polymer with concomitant formation of gel. Alkali metal hydroxides left in the polymers are deleterious for many uses of such polymers. For instance, a liquid polymer, which is to be incorporated in low plasticity synthetic rubber for improving its processing characteristics, will impart too fast a curing rate of a compound of said rubber if it contains alkali metal hydroxides. A liquid polymer which is to be used as a drying oil should not contain any substantial amount of alkali metal or alkali metal compounds as these tend to render the liquid cloudy and cause undesirable reactions when compounding these oils in paints, various types of varnishes and protective surface coatings and adhesive formulations.

By the term "alkali metal impurities," employed herein, it is meant to include free alkali metal and/or organo alkali metal compounds formed during the polymerization and present in the polymer product, and also organo alkali metal compounds employed as catalysts, such as sodium butyl, sodium triphenyl methyl, and the like, and alkali metal hydrides. These latter compounds are exemplary of catalysts within the group consisting of the alkali metals, the alkali metal hydrides, the alkali metal alkyls, and the alkali metal aryls. Any of the above-mentioned type materials, i.e., free alkali metals such as sodium, potassium, or lithium, and/or the defined organo alkali metal compounds, when present in the polymer product comprise the said "alkali metal impurities," removed from the polymer in accordance with this invention.

The present invention is directed to a process for recovering a substantially catalyst free product, either as a solution of the polymer in an organic solvent or as the liquid polymer free of solvent. It has long been known that contacting the polymerization zone effluent with an alcohol results in deactivation of the catalyst. Alcohols known in the art for such treatment include, preferably, those containing up to four carbon atoms per molecule such as methyl alcohol, ethyl alcohol, the propyl alcohols, the butyl alcohols, propylene glycol and butylene glycol.

According to prior art processes, it has been common to treat the polymer, following treatment with the alcohol, in a water washing step. Such water washing produces a substantially catalyst-free product but, in some cases, leads to the formation of emulsions which reduce the ultimate yield of product. Furthermore, the presence of even trace amounts of water is deleterious to filtration rates and to the ash content of the finished polymer.

Broadly, the present invention is directed to treatment of the polymers, commonly the process being practiced on the reaction zone effluent, by a method which does not involve the use of water.

The following are objects of this invention.

An object of this invention is to provide alkali metal free liquid polymers of conjugated diolefins. A further object of this invention is to provide a process for removing alkali metal impurities from liquid polymers of conjugated dienes. A further object of this invention is to provide a process for the removal of alkali metal impurities from homopolymers of 1,3-butadiene and copolymers of 1,3-butadiene and 2-methyl-5-vinylpyridine.

Other objects and advantages of this invention will be apparent to one skilled in the art upon reading this disclosure.

As stated, the present invention relates to liquid polymers of conjugated dienes prepared according to the method disclosed in Patent No. 2,631,175. As shown in said patent, the alkali metals can be used to produce liquid polymers of good quality, said polymers having a viscosity in the range of 100 to 6000 Saybolt Furol seconds at 100° F. The polymers include homopolymers of conjugated dienes containing 4 to 8 carbon atoms, those containing 4 to 6 carbon atoms being preferred. Representative conjugated dienes include 1,3-butadiene, isoprene, piperylene, 2-methyl-1,3 - pentadiene, 2,3-dimethyl-1,3-butadiene, 2-methyl-1,3 - hexadiene, and 1,3-octadiene. Various vinylidene containing comonomers can be used in combination with the conjugated diene, these including, for example, styrene, vinyl chloride, acrylonitrile, methyl vinyl ether, and the like. A group of copolymers of current interest are those prepared by polymerizing a major amount of a conjugated diene as above defined and a copolymerizable heterocyclic nitrogen base.

The heterocyclic nitrogen bases which are applicable are those of the pyridine and quinoline series which are copolymerizable with a conjugated diene and contain one

substituent wherein R is either hydrogen or a methyl group, i.e., the substituent is either a vinyl or an alpha-methylvinyl (isopropenyl) group. The vinyl-substituted heterocyclic nitrogen bases of the pyridine and quinoline series which are preferred are those having only one

substituent and of these compounds, those belonging to the pyridine series are most frequently used. Various derivatives can also be used but it is generally preferred that the total number of carbon atoms in the nuclear-substituted groups, in addition to the vinyl or alpha-methylvinyl, should not be greater than 12 and most frequently these alkyl substituents are methyl and/or ethyl.

These heterocyclic nitrogen bases have the formula

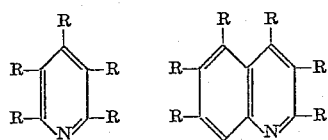

or

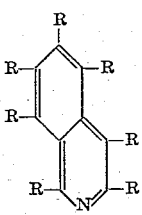

where R is selected from the group consisting of hydrogen, alkyl, vinyl, alpha-methylvinyl, alkoxy, halo, hydroxy, cyano, aryloxy, aryl, and combinations of these groups such as haloalkyl, alkaryl, hydroxyaryl, and the like; one and only one of these groups being selected from the group consisting of vinyl and alpha-methylvinyl; and the total number of carbon atoms in the nuclear substituted groups, in addition to the vinyl or alpha-methylvinyl group, being not greater than 12. Examples of such compounds are 2-vinylpyridine; 2-vinyl-5-ethylpyridine; 2-methyl-5-vinylpyridine; 4-vinylpyridine; 2,3,4-trimethyl-5-vinylpyridine; 3,4,5,6-tetramethyl-2 - vinylpyridine; 3-ethyl-5-vinylpyridine; 2,6-diethyl-4 - vinylpyridine; 2-isopropyl-4-nonyl-5-vinylpyridine; 2 - methyl - 5-undecyl-3-vinylpyridine; 2,4-dimethyl-5,6 - dipentyl-3-vinylpyridine; 2-decyl-5-(alpha-methylvinyl)pyridine; 2 - vinyl-3-methyl-5 - ethylpyridine; 2-methoxy-4-chloro-6-vinylpyridine; 3-vinyl-5-ethoxypyridine; 2 - vinyl - 4,5-dichloropyridine; 2-(alpha-methylvinyl) - 4 - hydroxy - 6-cyanopyridine; 2-vinyl - 4 - phenoxy-5-methylpyridine; 2-cyano-5-(alpha-methylvinyl)pyridine; 3 - vinyl-5-phenylpyridine; 2-(para-methylphenyl) - 3 - vinyl-4-methylpyridine; 3-vinyl-5-(hydroxyphenyl)pyridine; 2-vinylquinoline; 2 - vinyl-4-ethylquinoline; 3 - vinyl - 6,7 - di - n - propylquinoline; 2-methyl-4-nonyl - 6 - vinylquinoline; 4 - (alpha-methylvinyl)-8-dodecylquinoline; 3 - vinylisoquinoline; 1,6-dimethyl - 3 - vinylisoquinoline; 2-vinyl-4-benzylquinoline; 3-vinyl - 5 - chloroethylquinoline; 3-vinyl-5,6-dichloroisoquinoline; 2-vinyl - 6 - ethoxy-7-methylquinoline; 3-vinyl-6-hydroxymethylisoquinoline; and the like.

When copolymers are prepared, the diene component is generally present in a major portion by weight based on the monomers charged.

As previously stated, the alcohol treatment of the prior art is used in the present invention for the deactivation of the catalyst. This treatment results in the formation of the corresponding alcoholate, such as, for example, sodium methylate. The alcohol is normally used in an amount at least equivalent to that corresponding to the alkali metal present.

The next step involves treatment with carbon dioxide, the addition of this material producing a bulky, flocculent or gelatinous precipitate which normally does not settle out of the solution but which can be removed by filtration.

An additional step which is frequently used in the purification of the polymer is passage thereof through an electrostatic field following preliminary filtration. Such a process is disclosed and claimed in my copending application Serial No. 690,182, filed October 11, 1957. In this process, the polymer is subjected to a direct current electrostatic field by passing it through a vessel comprising an annular electrode and a center electrode. Either a solution or the liquid polymer itself can be passed through this apparatus. Maintained between these electrodes is a voltage gradient in the range of 800 to 33,000 volts per inch of electrode spacing. Such treatment removes any gel which is present in the liquid polymer and produces a gel-free product. Further details of this purification process are available in my copending application.

An alternative process is to pass the polymer immediately after treatment with the carbon dioxide (without preliminary filtration) through the zone wherein the direct current electrostatic field is maintained.

This application is related to my application Serial No. 770,601, filed concurrently herewith, which involves the use of carbon disulfide in place of the carbon dioxide of the present invention. The choice between these two types of treatment is somewhat dependent upon the method of removal of the precipitate following the treatment with the carbon disulfide or the carbon dioxide. The use of carbon dioxide results in the production of a bulky, flocculent or gelatinous precipitate which settles, if at all, very slowly from the polymer or polymer solution. This precipitate is distinguished from the crystalline precipitate when using carbon disulfide which does settle comparatively quickly. In many cases, better filtration is obtained following the use of carbon dioxide. Using either additive, the treatment with the direct current electrostatic field can be used but, since a greater volume of material is removed therein when using the carbon dioxide, more frequent cleaning is required than when using the carbon disulfide and a settling operation.

In the data presented in this application, treatment of a copolymer of 1,3-butadiene and 2-methyl-5-vinylpyridine is presented. This is done primarily because such a polymer represents a more difficult purification problem than does a totally hydrocarbon polymer such as the homopolymer of butadiene or a butadiene/styrene copolymer.

The following example presents data concerning a separation based upon the present invention although, obviously, the specific numerical limits shown should not be considered unduly limiting.

*Example*

A liquid copolymer of 1,3-butadiene and 2-methyl-5-vinylpyridine was prepared using a monomer ratio of 85 parts by weight butadiene and 15 parts by weight of 2-methyl-5-vinylpyridine. This material was polymerized at a temperature of 185° F. and a pressure of 30 p.s.i.g. using finely divided sodium as the catalyst in an amount of approximately 1 weight percent based upon the monomers charged. Commercial grade normal heptane was used as the solvent in an amount to give an approximate 40 weight percent solution of the liquid polymer. Following polymerization, methyl alcohol was added in an amount to give a 100 percent excess based upon the sodium present.

Following the treatment with the methyl alcohol, the mixture was carbonated by the introduction of carbon dioxide for 1½ hours at 95° F. while maintaining a pressure of 25 p.s.i.g. A bulky flocculent precipitate formed and the mixture was then filtered. Used was a small pressure filter having a three square inch filter area while maintaining a pressure drop across the filter of 10 p.s.i.g. The filtrate volume at 100 seconds was 0.5 milliliter; at 300 seconds 1.6 milliliters; at 900 seconds 3.6 milliliters; and at 1800 seconds 5.7 milliliters. The liquid polymer, after removal of the solvent therefrom, had an ash content of 0.003 weight percent and a viscosity of approximately 3,000 Saybolt Furol seconds at 100° F. Without the carbon dioxide treatment, the filtrate volume at 100 seconds was 0; at 300 seconds, 0.3 milliliter; at 900 seconds, 0.4 milliliter; at 1800 seconds, 0.6 milliliter; and the ash content was 0.002 weight percent.

A portion of this polymer was mixed with toluene to give a solids content of 50 percent by weight. This material was coated onto commercial electrolytic tin plate and baked at 390° F. for 13 minutes. The material was shown to be very satisfactory as a can coating.

As shown in the example, it is preferable to add the carbon dioxide at an elevated temperature because this increases the reaction rate. Temperatures, however, can vary from as low as 50° F. up to 200° F., the exact temperature not being critical. The addition of the carbon dioxide to the alcohol treated material results in the formation of sodium methylate. Thus, it will be seen that the amount of carbon dioxide used should be at least equivalent to the sodium present, and it is preferable to use a considerable excess, as much as 100 percent, in order to insure complete reaction. The precipitate formed is sodium methyl carbonate.

As many possible embodiments can be made of this invention without departing from the scope thereof, it is to be understood that all matter hereto set forth is to be interpreted as illustrative and not as unduly limiting the invention.

I claim:

1. A method for treating a liquid polymer produced by polymerization of a conjugated diene in the presence of an alkali metal catalyst and which contains alkali metal as an impurity, which comprises treating said liquid polymer in the absence of water with an alcohol and thereafter carbon dioxide, and removing the resulting precipitate from said liquid polymer.

2. The method of claim 1 wherein said liquid polymer is a homopolymer of liquid polybutadiene.

3. The method of claim 1 wherein said liquid polymer is a copolymer of 1,3-butadiene and styrene.

4. The method of claim 1 wherein said liquid polymer is a copolymer of 1,3-butadiene and 2-methyl-5-vinylpyridine.

5. A method for treating a liquid polymer produced by polymerization of a conjugated diene in the presence of an alkali metal catalyst and which contains alkali metal as an impurity, which comprises treating said liquid polymer in the absence of water with methyl alcohol and thereafter carbon dioxide, and removing the resulting precipitate from said liquid polymer.

6. A method for treating a liquid polymer produced by the solution polymerization of 1,3-butadiene and 2-methyl-5-vinylpyridine in the presence of a sodium polymerization catalyst and which contains sodium as an impurity, which comprises treating the polymerization zone effluent in the absence of water with methyl alcohol in an amount at least equal to that required to react with all sodium present, thereafter passing carbon dioxide through the mixture until a precipitate is formed, and filtering the resulting mixture to remove said precipitate from said polymer.

References Cited in the file of this patent

UNITED STATES PATENTS

| | | |
|---|---|---|
| 1,990,213 | Winkler et al. | Sept. 6, 1932 |
| 2,813,136 | Mertz | Nov. 12, 1957 |
| 2,827,447 | Nowlin et al. | Mar. 8, 1958 |